United States Patent
Suzuki

(10) Patent No.: US 6,512,477 B2
(45) Date of Patent: Jan. 28, 2003

(54) DETECTING APPARATUS

(75) Inventor: Tomohiko Suzuki, Nishinomiya (JP)

(73) Assignee: Furuno Electric Company, Limited, Hyogo-ken (JP)

( * ) Notice: Subject to any disclaimer, the term of this patent is extended or adjusted under 35 U.S.C. 154(b) by 0 days.

(21) Appl. No.: 09/973,709

(22) Filed: Oct. 11, 2001

(65) Prior Publication Data
US 2002/0080058 A1 Jun. 27, 2002

(30) Foreign Application Priority Data
Oct. 11, 2000 (JP) ........................................ 2000-310877

(51) Int. Cl.[7] ........................... G01S 7/04; G01S 13/00; G01S 15/00
(52) U.S. Cl. ................... 342/181; 342/22; 342/175; 342/176; 342/195; 367/68; 367/70; 367/107; 367/110
(58) Field of Search ........................ 342/22, 27, 28, 342/175–186, 195, 26; 367/68, 69, 70, 71, 72, 107, 108–116, 87–106

(56) References Cited

U.S. PATENT DOCUMENTS

| | | | |
|---|---|---|---|
| 2,911,640 A | * 11/1959 | Atlas | 342/181 |
| 3,050,723 A | * 8/1962 | Atlas | 342/181 |
| 4,179,681 A | 12/1979 | Zehner et al. | |
| 4,443,797 A | 4/1984 | Cramp et al. | |
| 5,031,157 A | * 7/1991 | Anderson et al. | 367/110 |
| 5,081,456 A | * 1/1992 | Michiguchi et al. | 342/181 |
| 5,198,819 A | * 3/1993 | Susnjara | 342/180 |

FOREIGN PATENT DOCUMENTS

| | | | | |
|---|---|---|---|---|
| DE | 3106100 A1 | * 9/1982 | | G01S/13/86 |
| EP | 0220014 A2 | 4/1987 | | |
| GB | 2195853 A | * 4/1988 | | G01S/7/04 |
| JP | 58-207146 A | * 12/1983 | | G06F/3/14 |
| JP | 64-59184 A | * 3/1989 | | 342/176 |

* cited by examiner

Primary Examiner—Bernarr E. Gregory
(74) Attorney, Agent, or Firm—Birch, Stewart, Kolasch & Birch, LLP

(57) ABSTRACT

While successively varying its orientation at specific intervals, a detecting apparatus transmits pulsed radio waves from an antenna (1), and data corresponding to input levels derived from one sweep are written in a primary memory (4). output values obtained in preceding signal processing operation are written in a secondary memory (9). A signal comparator circuit (7) determines current output values based on the input levels of the primary memory (4) and the preceding output values of the secondary memory (9) by reference to a table (8) and writes the current output values thus obtained in the secondary memory (9). The detecting apparatus causes display brilliance or color between a blip exhibiting large fluctuation in received signal strength and a blip exhibiting small fluctuation in received signal strength. Alternatively, the detecting apparatus causes the pattern of fluctuation in display brilliance or color according to fluctuation in received signal strength at the same point or at nearby points to vary from one transmit/receive cycle to another depending on whether the received signal strength has once exceeded a specified value or not.

7 Claims, 4 Drawing Sheets

E1: Land
E2: Ship
E3: Navigational Buoy
E4: Bird
E5: Sea Clutter

FIG. 3

Signal Processing Table

| Input Level | Preceding Output Level |  |  |  |  |  |  |  |  |  |  |  |  |  |  |  |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| 0 | 0 | 3 | 3 | 3 | 3 | 3 | 3 | 3 | 3 | 3 | 3 | 3 | 3 | 3 | 3 | 3 |
| 0 | 0 | 4 | 4 | 4 | 4 | 4 | 4 | 4 | 4 | 4 | 4 | 4 | 4 | 4 | 4 | 4 |
| 1 | 4 | 4 | 4 | 4 | 4 | 4 | 4 | 4 | 4 | 4 | 4 | 4 | 4 | 4 | 4 | 4 |
| 2 | 4 | 4 | 4 | 4 | 4 | 4 | 4 | 4 | 4 | 4 | 4 | 4 | 4 | 4 | 4 | 4 |
| 3 | 15 | 15 | 15 | 15 | 15 | 15 | 15 | 15 | 15 | 15 | 15 | 15 | 15 | 15 | 15 | 15 |
| → 0 | 12 | 12 | 12 | 12 | 12 | 12 | 12 | 12 | 12 | 12 | 12 | 12 | 12 | 12 | 12 | 12 |
| 5 | 12 | 12 | 12 | 12 | 12 | 12 | 12 | 12 | 12 | 12 | 12 | 12 | 12 | 12 | 12 | 12 |
| 6 | 12 | 12 | 12 | 12 | 12 | 12 | 12 | 12 | 12 | 12 | 12 | 12 | 12 | 12 | 12 | 12 |
| 7 | 15 | 15 | 15 | 15 | 15 | 15 | 15 | 15 | 15 | 15 | 15 | 15 | 15 | 15 | 15 | 15 |
| 8 | 15 | 15 | 15 | 15 | 15 | 15 | 15 | 15 | 15 | 15 | 15 | 15 | 15 | 15 | 15 | 15 |
| 9 | 15 | 15 | 15 | 15 | 15 | 15 | 15 | 15 | 15 | 15 | 15 | 15 | 15 | 15 | 15 | 15 |
| 10 | 15 | 15 | 15 | 15 | 15 | 15 | 15 | 15 | 15 | 15 | 15 | 15 | 15 | 15 | 15 | 15 |
| 11 | 15 | 15 | 15 | 15 | 15 | 15 | 15 | 15 | 15 | 15 | 15 | 15 | 15 | 15 | 15 | 15 |
| 12 | 15 | 15 | 15 | 15 | 15 | 15 | 15 | 15 | 15 | 15 | 15 | 15 | 15 | 15 | 15 | 15 |
| 13 | 15 | 15 | 15 | 15 | 15 | 15 | 15 | 15 | 15 | 15 | 14 | 14 | 14 | 14 | 14 | 14 |
| 13 | 15 | 15 | 15 | 15 | 15 | 15 | 15 | 15 | 15 | 14 | 14 | 14 | 14 | 14 | 14 | 14 |

DETECTING APPARATUS

BACKGROUND OF THE INVENTION AND RELATED ART STATEMENT

The present invention relates to detecting apparatus, such as a radar system, a scanning sonar or a fish-finding echo sounder, which detect targets or other objects by transmitting propagating waves like radio waves or sound waves in specified directions and receiving reflected waves from those objects.

In radar systems installed on vessels, for example, there exist conventional techniques which enable an operator to discriminate the levels of received signals from an on-screen image. Specifically, a monochrome radar controls its on-screen display in such a manner that echoes are displayed at different levels of brightness which are approximately proportional to the levels of the received signals, whereas a color radar controls its on-screen display in such a manner that echoes are displayed in different colors depending on the levels of the received signals.

Generally, the higher the target strength, the higher the levels of the received signals. Thus, in the aforementioned monochrome radar, for example, objects having high target strengths are displayed with high brilliance while objects having low target strengths are displayed with lower brilliance. In the aforementioned color radar, on the other hand, objects having high target strengths are painted in red while objects having low target strengths are displayed in green, for example.

These conventional radar systems are associated with a problem that it is difficult to distinguish true echoes reflected by vessels or ground, for instance, when the received echo signals contain unwanted signals, such as reflections from the sea surface, rain or snow. Although it is possible to suppress these unwanted signals to a certain degree by means of a sensitivity time control (STC) circuit and a fast time constant (FTC) circuit, these circuits do not always exhibit optimum response characteristics but could adversely affect true target echoes depending on their settings.

Although the conventional monochrome radar displays short-range targets with high brilliance and long-range targets with low brilliance on average. But there are cases small targets are shown with low brilliance in a short-range or large targets are shown with low brilliance in a long-range. It is therefore difficult to distinguish the types of targets simply from their brilliance on a screen. This is true in the conventional color radar as well.

The above fact also applies to detecting apparatus like scanning sonars and fish-finding echo sounders which utilize sound waves. More specifically, since both fish close to the bottom and the bottom itself similarly return strong echoes of sound waves, it is occasionally difficult to discriminate fish schools from the brilliance or display colors of their echoes on these detecting apparatus.

SUMMARY OF THE INVENTION

It is an object of this invention to solve the aforementioned problems and, more particularly, to provide detecting apparatus which enable easy discrimination of target types, or easy discrimination of desired and undesired targets.

In one principal form of the invention, a detecting apparatus detects targets by periodically transmitting propagating waves in a specific detecting direction and receiving echoes reflected by the targets, wherein display brilliance or color is varied between a blip exhibiting large fluctuation in received signal strength and a blip exhibiting small fluctuation in received signal strength from one transmit/receive cycle to another, the blips being detected at the same point or at nearby points in the detecting direction.

In a radar system which repeatedly scans in successively varying antenna directions, for example, a target like a land or an anchored vessel produces practically the same received signal strength from one scanning cycle to another when observed within a short time span. In contrast, the received signal strength of echoes due to reflections from rain or snow or sea clutter varies within a short period of time, e.g., from one scanning cycle to another. According to the invention, display brilliance or color is varied between a blip exhibiting large fluctuation in received signal strength and a blip exhibiting small fluctuation in received signal strength from one scanning cycle to another. This makes it easy to distinguish target types. Specifically, it becomes easy tell whether a particular target is a stable one like land or a vessel, an unstable one like a navigational buoy or a bird whose received signal strength fluctuates within a relatively short period of time due to their swing motion, movement, or such a target as rain, snow or sea clutter whose received signal strength is low fluctuates within an extremely short period of time based on their display brilliance or color.

In a scanning sonar or a fish-finding echo sounder, practically the same received signal strength is obtained from sea bottom reflection from one transmit/receive cycle to another when observed within a short time span. However, a moving fish school, for instance, produces a received signal strength that varies within a short period of time, e.g., every transmit/receive cycle. Since the display brilliance or color is varied between a blip exhibiting large fluctuation in received signal strength and a blip exhibiting small fluctuation in received signal strength from one transmit/receive cycle to another in the present invention, it is possible to easily recognize whether a particular target is a stable one like the seabed or an unstable one like a fish school whose received signal strength fluctuates within a short period of time based on their display brilliance or color.

In the context of this Specification, the expression "target" is used to mean not only a single target that is searched for for specific purposes but also any objects which reflect such propagating waves as electromagnetic waves or ultrasonic waves, including a continuous mass of a object, scattered objects, or a group of scattered objects. Thus, a vessel, land, buoy, rain, snow and sea surface are all "targets" for the radar system. Likewise, fish schools, seabed and large-sized individual fish are all "targets" for the scanning sonar and fish-finding echo sounder.

In another principal form of the invention, a detecting apparatus detects targets by periodically transmitting propagating waves in a specific detecting direction and receiving echoes reflected by the targets, wherein the pattern of fluctuation in display brilliance or color is varied according to fluctuation in received signal strength at the same point or at nearby points in the detecting direction from one transmit/receive cycle to another depending on whether the received signal strength has once exceeded a specified value or not.

In a radar system, for example, a navigational buoy or a seabird has a high target strength against electromagnetic waves so that high received signal strengths are obtained at specific frequency although the received signal is not necessarily strong in every scannin cycle. Even with this kind of target whose received signal strength is unstable, its on-screen echo is presented with a different pattern of fluctuation in display brilliance or color compared to reflections from other targets such as rain, snow and sea surface, once that target is received with a high received signal strength. This makes it easy to distinguish target types.

In one aspect of the invention, the detecting apparatus comprises a signal processor which determines a new output value corresponding to new display brilliance or color based on input values including a previous output value representative of previous display brilliance or color and a value representative of a new received signal strength, wherein the signal processor makes such determination of the new output value by reference to a table containing the received signal strength and the previous output value as header words and candidates for the new output value as data contents.

This structure enables a wide variety of mathematical formulae to be implemented for determining the new output value based on the previous output value and the new received signal strength, thereby allowing diversification of relationship between fluctuation in received signal strength and variation in display brilliance or color. In addition, this structure enables high-speed determination of the new output value.

In another aspect of the invention, the signal processor determines the new output value by using a mathematical equation of which input variables are the received signal strength and the previous output value and output variable is the new output value.

This structure makes it possible to perform the same function as achieved with the aforementioned table while eliminating the need for memory capacity for accommodating the table.

In still another aspect of the invention, the radar apparatus comprises a transmitter which substantially periodically transmits search signals in a direction, a receiver which receives echoes reflected by targets, and a signal processor which varies display brilliance or color depending on the degree of signal strength fluctuations of received echo signals resulting from a plurality of search signals and produced at the same points or nearby points in said direction.

BRIEF DESCRIPTION OF THE DRAWINGS

FIG. 3 is a diagram showing an example of the makeup of data contents of a signal processing table used in the radar system of FIG. 1;

DETAILED DESCRIPTION OF THE PREFERRED EMBODIMENTS OF THE INVENTION

Figure 1:
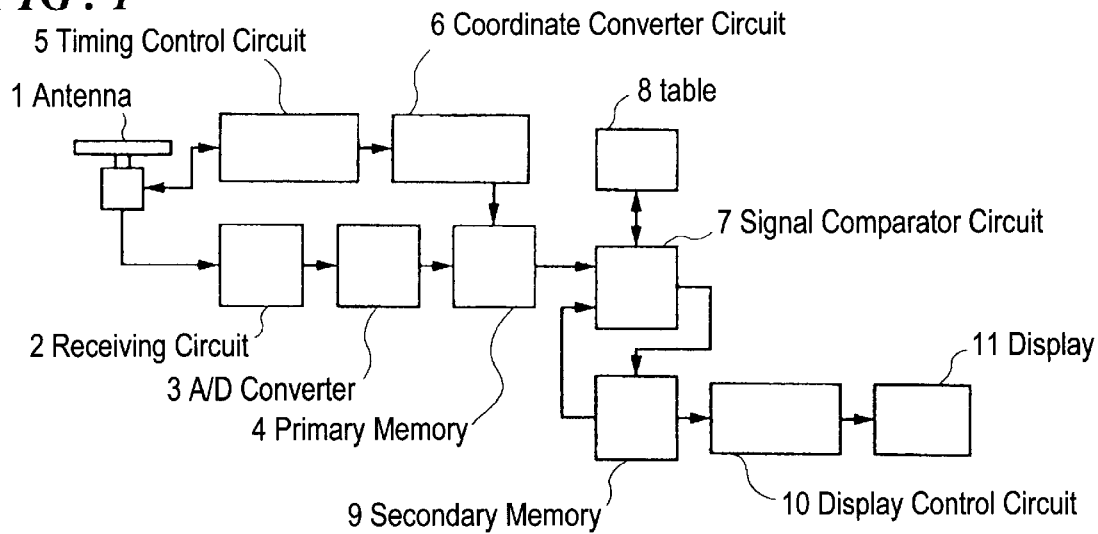
FIG. 1 is a block diagram showing the construction of a radar system according to a first embodiment of the invention.

Now, the construction of a radar system according to a first embodiment of the present invention is described referring to FIGS. 1–4, in which FIG. 1 is a block diagram of the whole radar system. In FIG. 1, designated by the numeral 1 is a radar antenna which continuously rotates in one direction to successively change its orientation, or sweep, through 360° around the antenna 1 itself. A receiving circuit 2 amplifies and demodulates a medium-frequency signal fed from the antenna 1. An analog-to-digital (A/D) converter 3 converts an input signal from the receiving circuit 2 into digital data made up of units of a specific number of bits. A primary memory 4 writes the digital data in its addresses specified by a coordinate converter circuit 6. A timing control circuit 5 transmits a transmission trigger signal to the antenna 1 and receives heading pulses and bearing pulses from the antenna 1. The coordinate converter circuit 6 generates and supplies memory addresses, in which the digital data representative of received signal levels are to be written, to the primary memory 4 according to count values of elapsed time after transmission of pulsed radio waves and the direction of the antenna 1 (heading pulses and bearing pulses) fed from the timing control circuit 5. As a result, the digital data corresponding to signals received during one rotation of the antenna 1 (one sweep) are written in the specified addresses of the primary memory 4. A signal comparator circuit 7 determines values to be output based on data stored in the same addresses of the primary memory 4 and a secondary memory 9 by reference to a table 8 and writes those values in the secondary memory 9. Details of this process will be described later.

A display control circuit 10 reads out contents of data written in the secondary memory 9 in synchronism with raster scan timing of a display 11. As a consequence, the data written in the secondary memory 9 is presented as a radar picture on the display 11.

Figure 2:
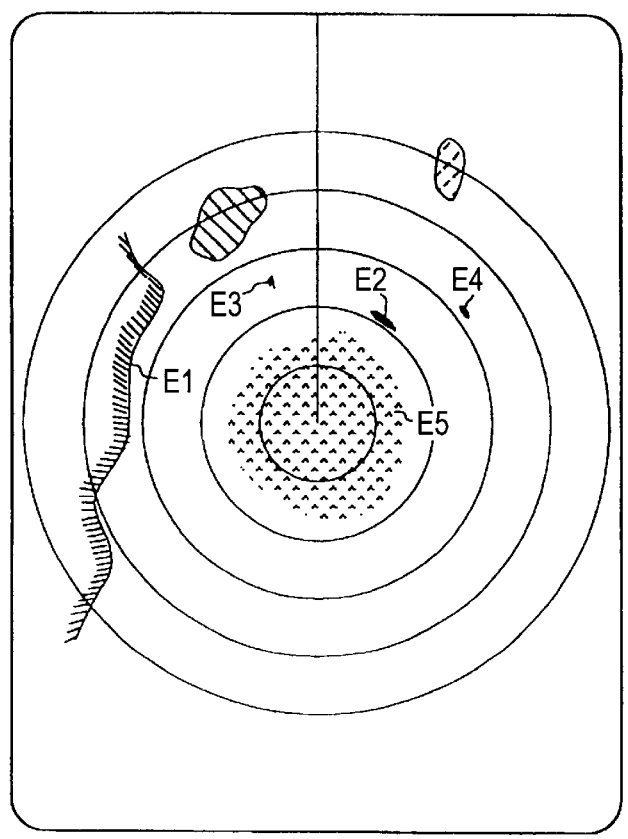
FIG. 2 is a diagram showing an example of an on-screen image presented on the radar system of FIG. 1.

FIG. 2 is a diagram showing an example of an on-screen image presented on the display 11. In this example, own ship is located at the screen center and the radar image is presented centering around own ship. In FIG. 2, designated by E1 is a land (coastline) echo, designated by E2 is a ship echo, designated by E3 is an echo of a navigational buoy, designated by E4 is an echo of a bird, and designated by E5 is an echo of sea clutter, or reflection from the sea surface. Both the land E1 and the ship E2 returns echoes of high received signal levels basically each successive rotation of the antenna 1, so that their echoes are presented with high brilliance or in colors (e.g., red) representative of strong echo signals. In contrast, echo signal levels from the navigational buoy E3 and the bird E4 fluctuate from one rotation of the antenna 1 to another due to their heave and swing motion or flight, so that the brilliance or color of their echoes varies. As will be described later, the navigational buoy E3 and the bird E4 are displayed with varying brilliance levels or colors including the brilliance levels or colors different from those of the echoes of such targets as the land E1 and the ship E2 producing strong and stable echo signals. The sea clutter E5 is painted in different form of fluctuation in brilliance or color compared to the navigational buoy E3 and the bird E4, because the received signal level and fluctuation pattern (periods of fluctuation) of the echo from the bird E4 differ from those of the navigational buoy E3 and the bird E4.

Next, operation of the signal comparator circuit 7 shown in FIG. 1 is described with reference to FIGS. 3 and 4.

FIG. 3 is a diagram showing an example of the makeup of data content of the table 8 which is referenced by the signal comparator circuit 7 of FIG. 1. The data content of the table 8 is arranged in the form of a matrix made up of current input signal levels (hereinafter referred to as the input levels)

0 to 15 and immediately preceding output levels 0 to 15 of the signal comparator circuit 7. The signal comparator circuit 7 outputs a value (current output level) at the intersection of the current input level and the preceding output level.

If the preceding output level is 0 and the current input level is 3, for example, the current output level would be 3. If the preceding output level is 14 and the current input level is 10, then the current output level would be 14.

Figure 4A:
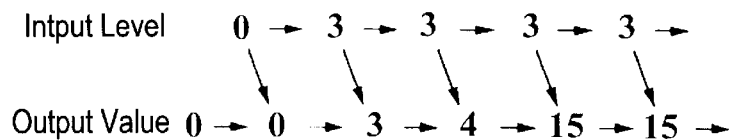
FIGS. 4A to 4E are diagrams showing how output level varies as a result of changes in the input level when the signal processing table of FIG. 3 is used.
Figure 4B:
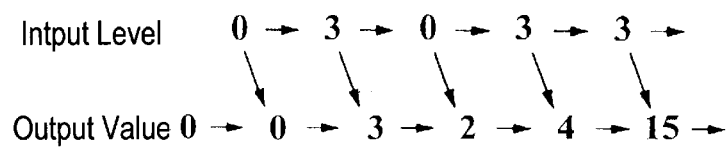

FIGS. 4A and 4B show examples of how the output level varies as a result of changes in the input level. More specifically, both FIGS. 4A and 4B show how the output level varies when the input level rises from 0 to specific values other than 0. In the example of FIG. 4A, if the current input level is 0 when the preceding output level was 0, the current output level would also be 0. Then, if the input level becomes 3 next, the current output level would become 3 as a result of a combination of the new input level 3 and the preceding output level 0. If the input level becomes 3 again, the current output level would become 4 as a result of a combination of the new input level 3 and the preceding output level 3. If the input level becomes 3 once again, the current output level would become 15 as a result of a combination of the new input level 3 and the preceding output level 4. Subsequently, as long as the input level falls within a range of 1 to 9, the output level stays at the value 15.

In the example of FIG. 4B, although the input level once falls from 3 to 0, the output level does not instantly drop to 0, but if a certain input level is maintained, no matter whether it is low, the output level immediately rises to a maximum level of 15, in just two steps. As would be recognized from the foregoing discussion, high output levels are maintained and target echoes are presented with high brilliance or in colors even if their input level is low, as long as the target echoes are present in each successive scan.

Figure 4C:
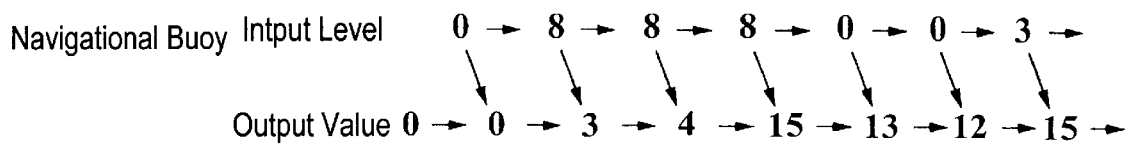

FIG. 4C shows an example of how the output level varies with changes in the input level derived from such targets as a navigational buoy or a bird. If the input level is 0 when the preceding output level was 0, the current output level would be 0. If the input level rises 8 in this condition, the current output level would become 3 as a result of a combination of the new input level 8 and the preceding output level 0. Then, if the input level remains at 8 next, the current output level would become 4 as a result of a combination of the new input level 8 and the preceding output level 3. If the input level still remains at 8 next, the current output level would become 15 as a result of a combination of the new input level 8 and the preceding output level 4. If the input level once drops to 0, the current output level would drop to 13 as a result of a combination of the new input level 0 and the preceding output level 15. If the input level is 0 again, the current output level would further drop to 12 as a result of a combination of the new input level 0 and the preceding output level 13. If the input level subsequently becomes equal to 3 or any value other than 0, however, the current output level instantly rises to 15 as a result of a combination of the new input level 3 or any value other than 0 and the preceding output level 12.

It is understood from the foregoing discussion that even if the input level becomes 0 after the output level has once reached the maximum level of 15, the output level immediately goes up to the same maximum level of 15 if the input level subsequently rises. Then, although the navigational buoy or bird does not produce a high input level every scanning cycle due to their swing motion or flight, targets having high target strengths against electromagnetic waves do not disappear from the screen but the brilliance or color of their echoes just varies according to variations in their input level. It is to be noted, however, that the brilliance or color of their echoes does not necessarily represent the current input level. Moreover, variations with time of the brilliance or color of their echoes do not represent variations in their input level. The brilliance and color of the echoes are determined based on the output levels and variations formulated in the table 8 whose data content is shown in FIG. 3.

If the input level becomes 0 in consecutive scanning cycles, the output level gradually decreases in a steplike fashion, such as 10, 9, 8, 7, 6 and 5, and then becomes 0. This means that the output level does not immediately become 0 but the preceding output level is maintained for a period corresponding to the duration of a previously entered input level even when the input level becomes 0 from other value. This would help prevent loss of targets whose echo levels fluctuate at relatively long periods.

If the values shown by an arrow in FIG. 3 are rewritten to read 4 to 1, it would be possible to increase the number of scanning cycles needed for the output level to gradually decrease.

Since fluctuation patterns of the brilliance and color of on-screen target echoes based on the data content of the table 8 are mostly determined by motion and reflecting properties of the targets, it becomes easier to distinguish target types, such as vessels, navigational buoys or birds, from the on-screen echoes.

Figure 4D:
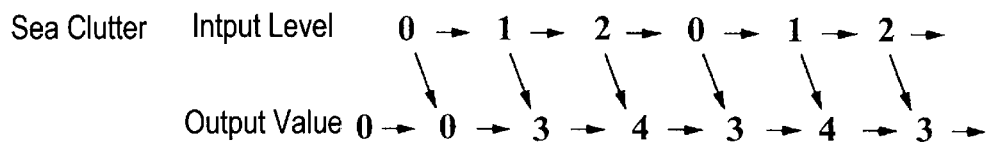
Figure 4D:
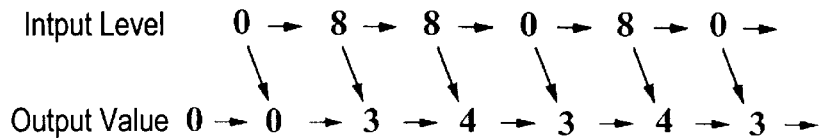

FIGS. 4D and 4D' show fluctuations in the input level due to reflections from rain or snow and sea clutter together with the corresponding output value.

In the example of FIG. 4D, the input level first changes from 0 to 1, and at this time, the current output level becomes 3 as a result of a combination of the current input level 1 and the preceding output level 0. If the input level becomes 2 next, the output level becomes 4 as a result of a combination of the input level 2 and the preceding output level 3. If the input level becomes 0 next, the output level becomes 3 as a result of a combination of the input level 0 and the preceding output level 4.

FIG. 4D' shows an example where the input level takes higher values than in the example of FIG. 4D. In this case, however, the output level varies from 0 to 0, 3, 4, 3, 4, 3, and so on, in just the same way as is the case with the example of FIG. 4D. As can be seen from these examples, if the input level decreases in an intermittent fashion, the output level cyclically becomes 3 and 4 and would not reach the maximum level of 15 in either case. This suggests that the brilliance and color of rain/snow clutter and sea clutter varies in a different pattern compared to the output value fluctuation patterns for such targets as navigational buoys and birds, and this difference in fluctuation pattern makes it possible to easily identify the rain/snow clutter and sea clutter from other targets.

Figure 4E:
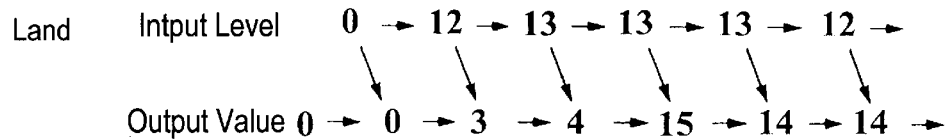

FIG. 4E shows an example where the input level is high and stable when such a target as a land or a vessel, for example, is detected. If the input level varies from 0 to 12, the current output level becomes 3 as a result of a combination of the current input level 12 and the preceding output level 0. If the input level successively takes larger values, such as 10 or above, subsequently, the output level varies from 3 to 4 and then to the maximum level of 15. Once the output level has reached the maximum level 15, and if the input level remains high and stable, the output level stabilizes at 14. This output level 14 is what does not appear in the examples of FIG. 4C or 4D. By making this stabilized output level 14 different from the maximum level 15 and thereby differentiating display brilliance or color, it becomes easy to recognize from the brilliance or color that the target has a high target strength and its echo is stable.

In the aforementioned examples, the radar system is set such that the higher the output level the higher the display brilliance in the case of a monochrome radar, according to output values 0 to 15. In the case of a color radar, the radar system is set such that the display color varies in multiple steps, such as green, yellow and red, for example, as the output value increases within a range of 0 to 14, and when the output value is 15, the display color becomes white, for example, to differentiate the target echo from the other colors. As a consequence, stable targets such as a land or vessels are shown with high brilliance or in red while navigational buoys and birds are presented as blips blinking in different brilliance levels or as blips whose display color varies between white and red, or between white and yellow, for example. In addition, the rain/snow clutter and sea clutter are displayed as low brilliance blinking echoes or as echoes whose display color varies between green and yellow, for example. Again, it is easy to distinguish the types of targets from the appearance of their on-screen echoes.

Although the signal comparator circuit 7 determines the current output value by reference to the table 8 in the example shown in FIG. 1, a predefined mathematical equation may be used to obtain the current output value based on the input level and the preceding output level. An example of such mathematical equations is shown below:

| x: 0 | |
|---|---|
| y(n-1): 15 | y(n) = 13 |
| y(n-1): 1 to 4, 6 to 14 | y(n) = y(n − 1) − 1 |
| y(n-1): 5 | y(n) = 0 |
| x: 1 to 15 | |
| y(n-1): 0 or 1 | y(n) = 3 + y(n − 1) |
| y(n-1): 2 or 3 | y(n) = 4 |
| y(n-1): 4 | y(n) = 15 |
| y(n-1): 5 to 7 | y(n) = 12 |
| y(n-1): 8 to 13 | y(n) = 15 |
| x: 1 to 9 | |
| y(n-1): 14 or 15 | y(n) = 15 |
| x: 10 to 15 | |
| y(n-1): 14 or 15 | y(n) = 14 | where the input level is expressed by x, the preceding output value is expressed by y(n−1), and the current output value is expressed by y(n).

The above equations mean that when the input level x is 0 and the preceding output value y(n−1) is 15, the current output value y(n) is set to 13. Similarly, when the input level x is 0 and the preceding output value y(n−1) is 1 to 4 or 6 to 14, the current output value y(n) is calculated by the expression y(n−1)−1.

The output value may be calculated in this way based on a judgment of conditions and the aforementioned equations.

Figure 5A:
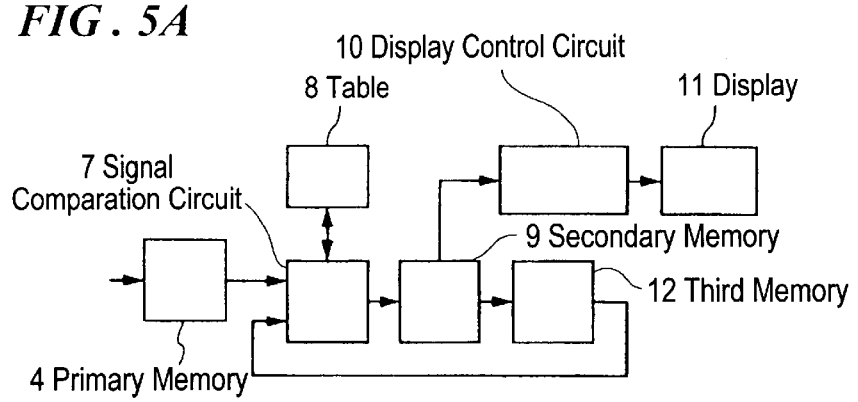
FIGS. 5A and 5B are block diagrams showing the construction of two radar systems according to a second embodiment of the invention.
Figure 5B:
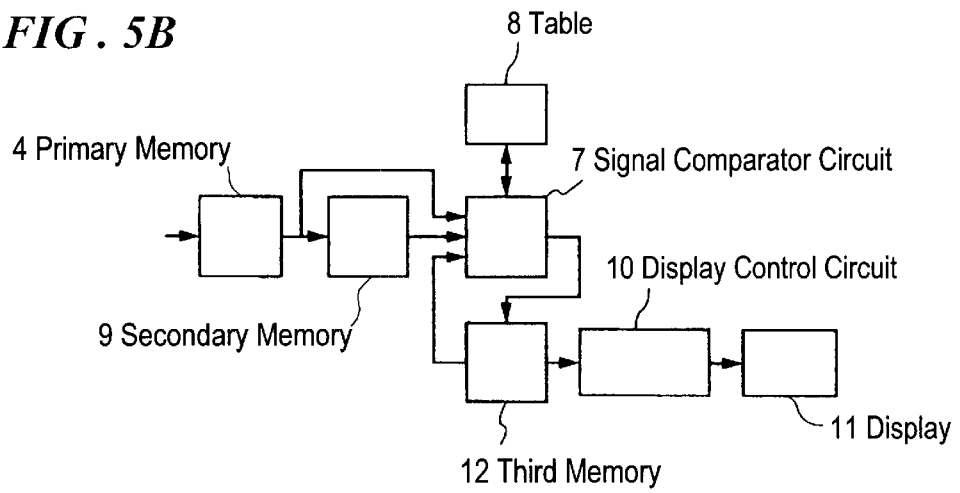

The construction of two radar systems according to a second embodiment of the invention is now described referring to FIGS. 5A and 5B, both showing the construction of stages from a primary memory 4 to a display 11. The construction of those stages that precede the primary memory 4 is identical to those shown in FIG. 1. In the example shown in FIG. 5A, the current input level is compared with an output value that precedes a preceding output value, instead of with the preceding output value. More specifically, there is provided a third memory 12 for storing data on output values derived from one sweep that have been once written in a secondary memory 9, wherein preceding output values are written in the secondary memory 9 and output values that precede the preceding output values are written in the third memory 12. A signal comparator circuit 7 determines values to be output based on the output values preceding the preceding output values written in the third memory 12 and the current input levels read out from the primary memory 4 by reference to a table 8. A display control circuit 10 reads out data contents written in the secondary memory 9 and delivers a display signal to the display 11.

By providing a time lag between the current output values and the input levels in this fashion, it becomes possible to cause the display brilliance or color to vary in response to target echo signals whose strengths fluctuate at relatively long periods.

In the example shown in FIG. 5B, current output values are determined based on current input levels, preceding input levels and preceding output values. More specifically, the current input levels are written in the primary memory 4, the preceding output levels are written in a secondary memory 9, and the preceding output values are written in a third memory 12. A signal comparator circuit 7 determines values to be output based on the current input levels read from the primary memory 4, the preceding input levels read from the secondary memory 9 and the preceding output levels read from the third memory 12 by reference to a table 8 and writes the current output values thus obtained in the third memory 12. Thus, data contents of the table 8 form a three-dimensional matrix whose input variables are input levels that precede the preceding input levels, the preceding input levels and the preceding output values, from which the current output values are obtained.

Since not only the current input levels and the preceding output values but also the input levels that precede the preceding input levels are considered as described above, it is possible to produce the output values taking into account fluctuation with time of the input level.

According to this construction, it is possible to cause the display brilliance or color to vary in response to target echo signals whose strengths fluctuate at relatively short periods.

Figure 6:
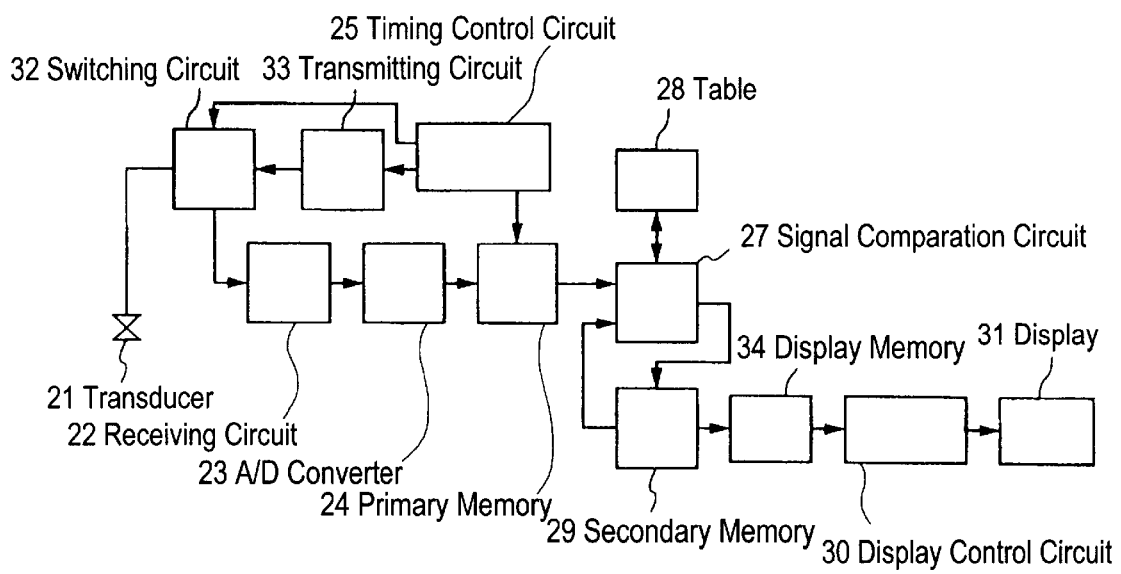
FIG. 6 is a block diagram showing the construction of a fish-finding echo sounder according to a third embodiment of the invention.

An example of a fish-finding echo sounder according to a third embodiment of the invention is now described referring to FIG. 6 which is a block diagram showing the construction of the whole fish-finding echo sounder. In FIG. 6, designated by the numeral 21 is a transducer which transmits ultrasonic pulses from the bottom of a vessel toward the seabed. A transmitting circuit 33 delivers an ultrasonic pulse signal to the transducer 21 through a switching circuit 32 in accordance with a trigger fed from a timing control circuit 25, thereby the ultrasonic pulses are transmitted toward the seabed. Immediately following each transmission of the ultrasonic pulse, a receiving circuit 22 receives echo signals reflected by the seabed or by fish schools. An A/D converter 23 converts the received echo signals into digital data made up of units of a specific number of bits and delivers the digital data to a primary memory 24, which writes the digital data in its addresses corresponding to locations at particular ranges and in particular directions (time and directions) specified by the timing control circuit 25. The primary memory 24 retains in its relevant memory locations the data derived from a single transmit/receive cycle (one sweep).

A secondary memory 29 stores preceding output values for one sweep, and a signal comparator circuit 27 determines current output values based on the current input levels written in the primary memory 24 and the preceding output values written in the secondary memory 29 by reference to a table 28.

In the radar systems of the first and second embodiments, the current output value for each point is determined based on the current input level and the preceding output value for the point located in the same direction and at the same distance (i.e., the same position) in each successive antenna rotation (scanning cycle). In the fish-finding echo sounder of the third embodiment, however, two points at the same distance from the transducer 21 are regarded as regarded as approximately the same point for echo data detected in one sweep and echo data detected in the next sweep in determining the current output value for that point based on the input level and the preceding output value. Needless to say, if the vessel is not running, data detected at the same distance from the aforementioned two sweeps, which are adjacent to each other in terms of time, are input levels actually obtained from the same point.

The invention is applicable not only to the aforementioned radar systems and fish-finding echo sounder but is similarly applicable to scanning sonars. A scanning sonar is a system which sounds underwater objects all around own ship or within a specific sector area with a specific tilt angle of a sounding beam. The configuration of the scanning sonar can be explained by using the block diagram of FIG. 1 if only the antenna 1 is replaced by an ultrasonic transducer array formed of a plurality of arrayed ultrasonic transducer elements, a transmitter drive circuit for phase-controlling and driving the ultrasonic transducer array, and a received signal synthesis circuit for synthesizing received signals by phase control operation. With this circuit configuration, the primary memory 4 writes data corresponding to input levels for each successive scanning cycle while the secondary memory 9 writes output values for each successive scanning cycle.

In the above-described fish-finding echo sounder and scanning sonar, such targets as large-sized individual fish or fish schools which could produce high input levels just intermittently are presented as on-screen echoes with varying brilliance or colors including brilliance levels or colors different from those of the echoes of such targets as the seabed producing high and stable input levels. Therefore, it becomes easier to distinguish the types of such targets.

What is claimed is:

1. A detecting apparatus comprising:
   a transceiver which periodically transmits propagating waves in a detecting direction and receives echoes reflected by targets; and
   a signal processor which varies display brightness or color of blips between a blip exhibiting large fluctuation in received signal strength and a blip exhibiting small fluctuation in received signal strength from one transmit/receive cycle to another, the blips resulting from echo signals produced at the same point or at nearby points in said detecting direction, so that said signal processor changes output level based on changes in input level.

2. The detecting apparatus according to claim 1, wherein said detecting apparatus is a radar system in which said propagating waves are electromagnetic waves.

3. The detecting apparatus according to claim 1, wherein said detecting apparatus is an ultrasonic detecting apparatus in which said propagating waves are ultrasonic waves.

4. A detecting apparatus comprising:
   a transceiver which periodically transmits propagating waves in a detecting direction and receives echoes reflected by targets; and
   a signal processor which varies a pattern of fluctuation in display brightness or color according to fluctuation in signal strength of the received signals produced at the same point or at nearby points in said detecting direction from one transmit/receive cycle to another depending on whether said received signal strength has once exceeded a specific value or not, so that said signal processor outputs a pattern of said fluctuation in signal strength once a specified input level is reached.

5. The detecting apparatus according to claim 1 or 4, wherein said signal processor determines a new output value corresponding to new display brilliance or color based on input values including a previous output value representative of previous display brilliance or color and a value representative of a new received signal strength, and wherein said signal processor makes such determination of the new output value by reference to a table containing said received signal strength and said previous output value as header words and candidates for said new output value as data contents.

6. The detecting apparatus according to claim 1 or 4, wherein said signal processor determines a new output value corresponding to new display brilliance or color based on input values including a previous output value representative of previous display brilliance or color and a value representative of a new received signal strength, and wherein said signal processor makes such determination of the new output value by using a mathematical equation of which input variables are said received signal strength and said previous output value and output variable is said new output value.

7. A radar apparatus comprising:
   a transmitter which periodically transmits search signals in a direction;
   a receiver which receives echoes reflected by targets; and
   a signal processor which varies display brightness or color depending on the degree of signal strength fluctuations of received echo signals resulting from a plurality of search signals and produced at the same points or nearby points in said direction, so that said signal processor changes output level based on changes in input level.

* * * * *